Sept. 29, 1959  E. H. YONKERS ET AL  2,906,925
AIRCRAFT LIGHTNING ARRESTER
Filed May 10, 1955  2 Sheets-Sheet 1
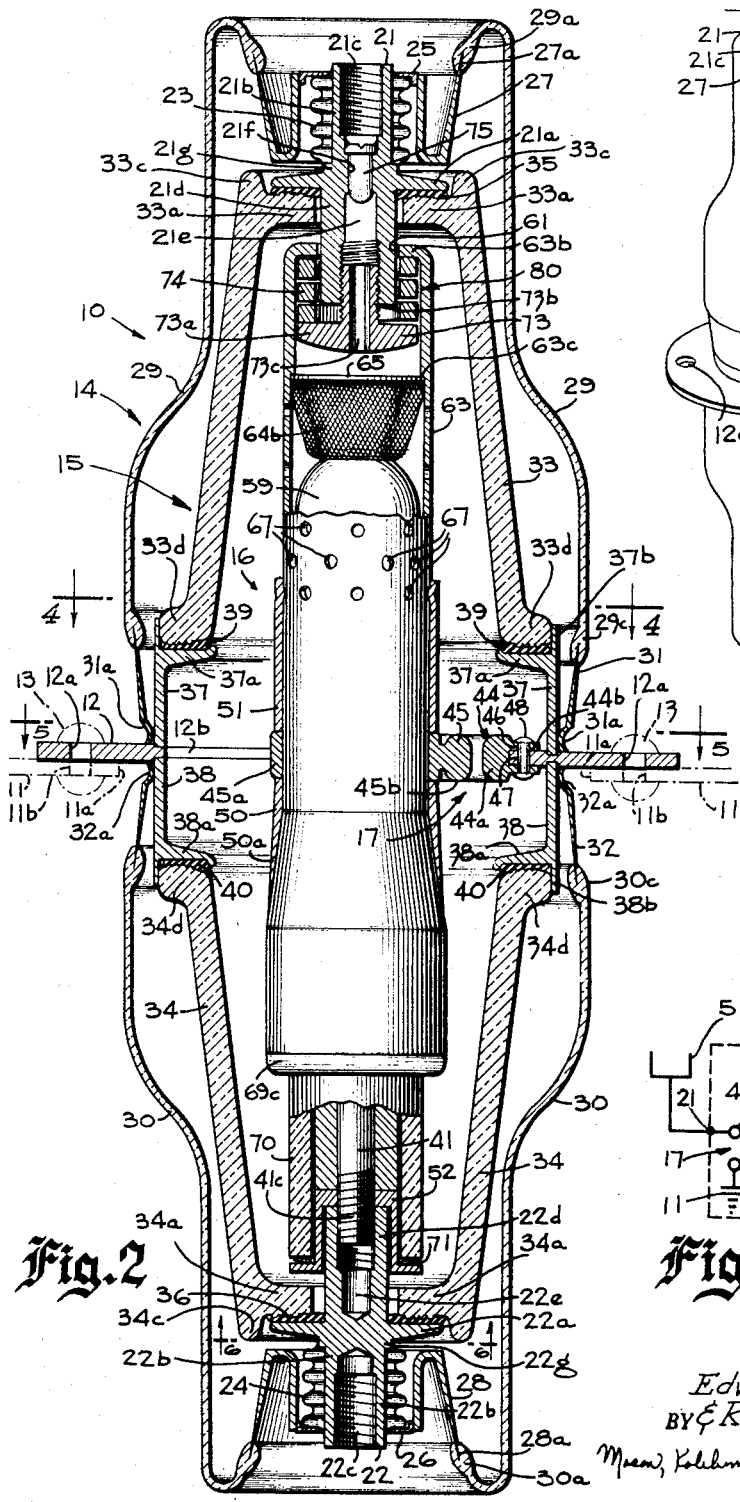
INVENTORS
Edward H. Yonkers
BY & Ronald F. Huber
ATTORNEYS Sept. 29, 1959  E. H. YONKERS ET AL  2,906,925
AIRCRAFT LIGHTNING ARRESTER
Filed May 10, 1955  2 Sheets-Sheet 2

INVENTORS
Edward H. Yonkers
BY & Ronald F. Huber
ATTORNEYS

United States Patent Office 2,906,925
Patented Sept. 29, 1959

2,906,925

AIRCRAFT LIGHTNING ARRESTER

Edward H. Yonkers, Glencoe, and Ronald F. Huber, Park Ridge, Ill., assignors to Joslyn Mfg. & Supply Co., Chicago, Ill., a corporation of Illinois Application May 10, 1955, Serial No. 507,284

16 Claims. (Cl. 317—61)

This invention relates to an aircraft lightning arrester and, more particularly, to an improved lightning arrester especially adapted to be interconnected between an aircraft antenna and aircraft communication equipment for minimizing the adverse effects of lightning and other high voltage discharges intercepted by the antenna while, at the same time, permitting normal operation of the aircraft communication equipment.

It is well recognized that aircraft in the vicinity of a thunder storm, or electrical storm of any type, may intercept high current lightning discharges and other high current surges. These surges are generally susceptible of classification into two categories, i.e., (1) discharges occurring between different cloud charge areas or (2) discharges occurring in a channel directed toward and terminating at the surface of the earth. Of these two types, the channel discharges have been acknowledged to be the more severe and, consequently, protection against high current surges of this intensity must be provided. As is known by those skilled in the art, the metal surface or fuselage of the aircraft provides a relative ground to which high current lightning surges may be diverted without injury to the occupants or to the communication or electronic equipment carried by the aircraft. It is, therefore, desirable to discharge to the fuselage all high current surges intercepted by antennas associated with the electronic equipment carried by the aircraft in order to minimize the effect of these surges.

Various lightning arresters have been designed to dissipate or bypass high current surges intercepted by an antenna. A few arresters employing simple by-pass gaps at the antenna post have proved definitely ineffective. The lightning surges are of such magnitude and waveshape that the electronic equipment will be destroyed or burned out before the breakdown voltage of such a by-pass gap is reached, primarily because even such relatively large currents as a 5000 ampere surge reaching its maximum amplitude in 0.005 second will produce a voltage of only 50 volts across an antenna tuning coil having an inductance of approximately 50 microhenries—a voltage of insufficient magnitude to effect breakdown of the by-pass gap. The current has to be changing in order to build up a voltage across a coil.

As is well known by those skilled in the art, a capacitor inserted between the antenna and communication equipment and in parallel with the spark gap limits the charge transfer to the communication equipment and eventually charges to a voltage sufficient to break down the spark gap at which time the lightning surge is dissipated. However, arresters employing a combination of a condenser and spark gap unit have generally been subject to rapid failure in that they are frequently rendered inoperative after the discharge of a single lightning surge as a result of capacitor breakdown or the like. Moreover, even if such arresters are capable of withstanding the first surge, they are generally reduced to a substantially non-usable state after several discharges of lightning surges since the surfaces of the spark gap electrodes are corroded or burned so badly that the breakdown voltage is substantially changed. Thus, the arresters heretofore proposed inherently possess an extremely short operating life and, hence, require frequent replacement.

With the advent and development of supersonic flight and of jet propelled aircraft, the operation of conventional aircraft arresters has become progressively less effective because of the tendency of increased flight altitudes to introduce attendant variations in temperature and pressure. Moreover, increased flight velocity of aircraft has provoked several structural problems with respect to increased vibration and the like.

In order to meet requirements laid down by the United States Air Force, it is essential to provide an aircraft lightning arrester of the combined capacitor spark gap type for high altitude aircraft that is able to satisfy the following specifications:

(1) The spark gap breakdown voltage varies less than 20% at 4 megacycles after by-passing six similar artificially created lightning discharges each having the following components:

(a) An initial component arising from zero to a crest value of 100,000 amperes in 5 microseconds and decaying to 50,000 amperes at approximately 10 microseconds from the beginning of the current, immediately followed by:

(b) A second component rising to approximately 2,500 amperes in 1½ milliseconds from its beginning with a total charge transfer in excess of 20 coulombs, immediately followed by:

(c) A third component rising to 230 amperes within $\frac{1}{10}$ second and remaining at 230 amperes for one second.

(2) In the event of capacitor breakdown or default, the arrester must be able to completely contain the resulting explosion.

(3) The arrester must be able to pass 10 amperes RF current at four megacycles for a period of ten minutes without heating of any parts and without indication of failure or deterioration.

(4) The spark gap must be adjustable from 7 to 12 kv. RF peak at 4 megacycles.

(5) The arrester must be able to operate satisfactorily over an altitude range of 0 to 60,000 feet and over a temperature range of minus 55 degrees to plus 70 degrees centigrade.

(6) The arrester must be limited to a weight of no more than 4¾ pounds.

(7) The arrester must be compact and capable of being readily mounted and removed from the surface of the aircraft and of being electrically interconnected between an antenna and electronic equipment carried by the aircraft.

(8) The condenser must be able to sustain 10,000 volts RF.

Accordingly, it is an object of the present invention to provide an improved aircraft lightning arrester which is capable of satisfying the aforementioned specifications.

Another object of the present invention is to provide an improved aircraft lightning arrester for high altitude aircraft which will protect the aircraft electronic equipment by diverting from the aircraft communication equipment to the fuselage of the aircraft high current lightning surges collected by the antenna.

It is a further object of the invention to provide an improved aircraft lightning arrester having a spark gap unit which will repeatedly break down at substantially the same predetermined breakdown voltage so that continuity of operation of the arrester without frequent replacement is insured.

Another object of the present invention is to provide an improved lightning arrester of the combined capacitor spark gap type which is able to contain any explosion caused by fracture of the condenser as a result of a high current surge.

A still further object of the present invention is to provide an improved aircraft lightning arester embodied in a compact, readily mountable and removable unit which is characterized by its ability to withstand vibration, its durability and its dependability.

Still another object of the invention is to provide, in an aircraft lightning arrester, an adjustable assembly unit which is adapted to be readily oriented in proper position to maintain the air resistance and pressure of a spark gap chamber substantially constant regardless of changes in the altitude of the aircraft.

Still another object of the present invention is to provide an aircraft lightning arrester having an assembly unit including coupling means adjustable from the exterior of the assembled arresters to increase or decrease the assembly force exerted on the component elements of the arrester.

Another object of the present invention is to provide, in an aircraft lightning arrester, a compact assembly unit containing a blocking condenser and which may be integrated with the other components of the arrester with a minimum of effort.

Other objects and advantages of the present invention will become apparent from the following description of an illustrative embodiment thereof, in the course of which reference is had to the accompanying drawings, wherein:

Fig. 1 is a perspective view illustrating a lightning arrester shown detached from the aircraft and characterized by the features of the present invention;

Fig. 2 is a greatly enlarged longitudinal sectional view taken substantially along the line 2—2 of Fig. 1;

Fig. 7 is a schematic diagram of an electrical circuit including the lightning arrester shown in Fig. 1 with certain of the component elements of the circuit being shown in block diagram form.

Figure 4:
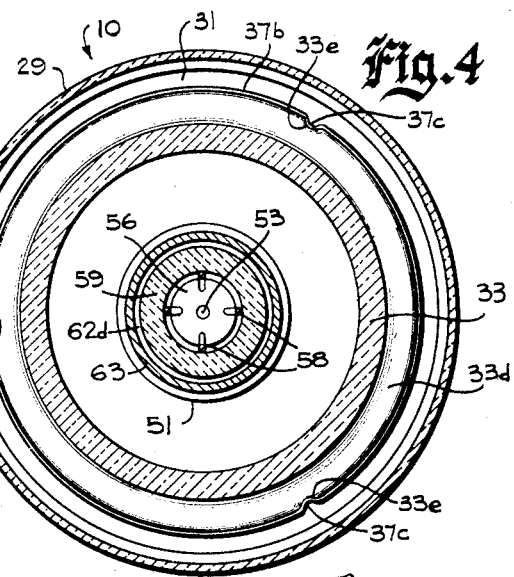
Fig. 4 is a sectional view, taken along line 4—4 of Fig. 2 assuming that the latter shows the complete structure.

Referring now to the drawings, and more particularly to Figs. 1 and 2 thereof, the present improved aircraft lightning arrester, generally identified by the reference numeral 10, is illustrated in upright position suitable for mounting upon the fuselage of an aircraft, as represented by the broken line structure 11 shown in Fig. 2. In order to provide for accommodation of the arrestor 10, the fuselage 11 includes structure defining a relatively large circular aperture 11a having a diameter comparable to the maximum diameter of the arrester 10 together with a plurality of spaced, considerably smaller apertures 11b formed adjacent the aperture 11a. The arrester 10 is provided with an annular mounting ring 12 having a plurality of spaced apertures 12a therein so arranged that, when the arrester 10 is inserted within the aperture 11a of the fuselage 11, each of the apertures 12a is aligned with one of the spaced apertures 11b in the fuselage. With the apertures 12a and 11b in alignment, suitable attaching means such as rivets 13 are inserted therethrough to secure the arrester 10 to the aircraft.

The function of the lightning arrester 10 will best be understood by reference to Fig. 7, wherein its opposed terminals or connectors 21 and 22 are respectively connected to an antenna 5 and to electronic or communication equipment indicated generally as 6. The lightning arrester 10 includes a spark gap unit 17 to be described more fully hereinafter for diverting high current surges to the fuselage 11 of the aircraft and a by-pass condenser designated by the reference numeral 8 for coupling RF signals from the antenna to the equipment 6 and for assisting in the breakdown of the spark gap unit 17. The arrester 10 further comprises a resistor 70 connected in parallel with the condenser 8 and with the spark gap unit 17 to provide a leakage path for static charges built up on the antenna 5.

Turning now to the construction of the aircraft lightning arrester 10 to perform the functions just described, this device comprises external and internal protective housings respectively designated as 14 and 15 which function to enclose the component elements of the arrester to be described hereinafter and to support the connectors 21 and 22 in spaced apart relationship. As best shown in Fig. 2, the connectors 21 and 22 are of similar construction and are respectively provided with outwardly extending annular flanges 21a and 22a formed intermediate their upper and lower extremities. The cylindrical outer end portions 21b and 22b of the connectors 21 and 22 include axially extending internally threaded cavities 21c and 22c formed therein while the inner end portions 21d and 22d, also cylindrical in shape, have defined therein internally threaded cavities 21e and 22e. The cavities 21c and 22c accommodate and provide electrical connections for an antenna jack leading to the antenna 5 (Fig. 7) and a communication equipment jack leading to the equipment 6. Hence, these jacks may be readily attached to and detached from the arrester 10. The cavities 21e and 22e function to receive an assembly unit indicated generally as 16 and enclosed within the internal housing 15. Interconnecting the cavities 21c and 21e of connector 21 only, is an axially extending bore 21f which is adapted to receive a plug 75 after an assembly unit adjusting tool has been passed through the bore during assembly of the arrester as described more fully hereinafter. As best shown in Fig. 2, the connectors 21 and 22 are respectively provided with annular shoulders 21g and 22g formed adjacent the flanges 21a and 22a for the purpose of receiving the internal edges of a pair of bellows 23 and 24. The bellows possess a hollow cylindrical configuration with corrugated surfaces and are adapted to encircle the outer end portions 21b and 22b of the connectors. These bellows are rigidly secured at their inner ends to the connector shoulders 21g and 22g as by solder welding the points of abutment. Washers 25 and 26 encircle the circular outer end portions 21b and 22b of the connectors and may be soldered to the outer ends of the bellows 23 and 24, respectively. Moreover, the washers 25 and 26 may be soldered or otherwise joined to connector bushings 27 and 28, respectively, of somewhat cylindrical configuration which connector bushings 27 and 28 surround the bellows 23 and 24 and have outer end portions 27a and 28a fixedly secured to the external housing 14. As will be understood by those skilled in the art, the bellows serve as temperature responsive means and move longitudinally along the portions 21b and 22b to compensate for expansion and contraction of the external housing 14 as a result of variation in temperature.

To facilitate attachment of the bushings 27 and 28 to the housing 14, the outer end portions 27a and 28a as illustrated in Fig. 2, are gradually tapered to a blade-like edge and, hence, effectively provide hermetic seals between the bushings 27 and 28 and jackets 29 and 30 of the external housing 14. The external jackets 29 and 30, preferably formed of glass or the like, have generally hollow cylindrical configurations with varying diameters, as best shown in Figs. 1 and 2. The smaller ends of the jackets 29 and 30 are curved inwardly and terminate in enlarged annular rings 29a and 30a which, when in a soft or plastic condition, receive the tapered ends 27a and 28a of the bushings and, accordingly, when these rings harden a firm, hermetic seal is effected. Similarly, the larger ends of the jackets 29 and 30 are provided with enlarged annular rings 29c and 30c for receiving the tapered edges of annular bushings 31 and 32 in order to provide hermetic seals therebetween. To prevent rupture of the above described hermetic seals by variations in temperature, it is evident that the bushings 27 and 28, 31 and 32, which preferably are of metal, and the glass jackets 29 and 30 must possess approximately equal temperature coefficients of expansion. The annular bushings 31 and 32 are relatively thin and have offset annular portions 31a and 32a soldered or otherwise secured to the mounting ring 12, thereby to form an air-tight seal. In this manner, there is provided a hermetically sealed external housing 14 capable of maintaining the internal pressure and internal air resistance of the arrester substantially constant. It will be understood, however, that the jackets 29 and 30 and the external bushings of the arrester 10 described above need not assume the particular shapes illustrated but may, instead, be designed in any manner to meet the particular requirements of the arrester.

As best shown in Fig. 2, the internal housing 15 includes tapered cup-shaped members 33 and 34 made of relatively thick Pyrex or other similar material. The bottom or partially closed ends of the cup-shaped members 33 and 34, designated as 33a and 34a, respectively, have surface areas substantially identical to the surface areas of the flanges 21a and 22a of the connectors. To provide cushioning and sealing means between the connectors 21 and 22 and the internal bushings 33 and 34, there are provided annular gaskets 35 and 36 made of silicon or the like and adapted to be interposed between the flanges 21a and 22a and the closed ends 33a and 34a of the cup-shaped members and encircling the inwardly extending circular portions 21d and 22d of the connectors.

Figure 6:
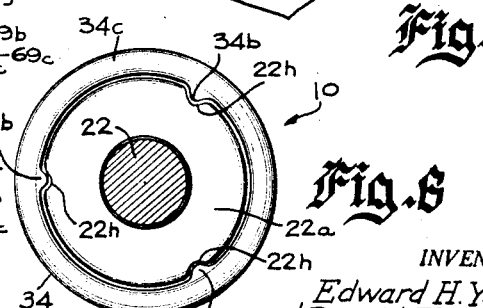
Fig. 6 is a sectional view taken substantially along line 6—6 of Fig. 2 assuming again that the latter shows the complete structure.

In order to align the connectors 21 and 22 with the internal housing 15 during assembly and to prevent relative rotation therebetween, after the assembly is completed, each of the connectors 21 and 22 includes a plurality of spaced indents which accommodate a plurality of correspondingly spaced ridges provided on housing 14. Specifically, as best shown in Fig. 6, the cup shaped member 34 includes spaced ridges 34b extending from a raised annular ring portion 34c and fitting within indents 22h formed in the outer periphery of the flange 22a. Obviously, the cup-shaped member 33 and the connector 21 are provided with similar cooperating ridges and indents although these are not visible in the drawings.

To facilitate engagement of the cup-shaped members 33 and 34 with arc shields 37 and 38, respectively, the former are provided, at their open ends, with outwardly extending annular flanges 33d and 34d. The arc shields 37 and 38 are of generally hollow cylindrical configuration and include inwardly extending annular flanges 37a and 38a together with thin annular heels 37b and 38b extending generally in the direction of the main body of the shields. Annular gaskets 39 and 40 made of silicon or the like are interposed between the annular flanges 37a and 38a and the flanges 33d and 34d in order to provide a seal between the cup-shaped members 33 and 34 and the arc shields 37 and 38. To facilitate alignment of the cup-shaped members 33 and 34 with the arc shields 37 and 38 during assembly and to prevent relative rotation between these parts, a plurality of spaced indents 33e, best shown in Fig. 4 of the drawings, are defined in the outer surface of the annular flange 33d and are adapted to accommodate a plurality of correspondingly spaced ridges 37c provided on the inner surface of the heel 37b. It will be understood that similar indents and ridges are provided on the cup-shaped member 34 and the shield 38 although these are not visible in the drawings. The adjacent ends of the arc shields 37 and 38 are soldered or otherwise secured to the mounting ring 12 and, hence, are positioned to form an arc chamber substantially enclosing a spark gap unit designated generally at 17. When a compressive force is applied, in a manner described below, to the connectors 21 and 22 and, in turn, to the cup-shaped members 33 and 34 and the arc shields 37 and 38, all of these elements will be brought into snug engagement with their respective gaskets thereby providing an air tight, gasket sealed interior housing 15.

It will be apparent from the foregoing description, that the arrester 10 comprises an external, hermetically sealed housing 14 and an internal, gasket sealed housing 15 for (1) maintaining the internal pressure and air resistance of the spark gap chamber substantially constant in order to insure breakdown of the spark gap unit 17 at a predetermined breakdown voltage, and (2) insuring that any explosion caused by failure of the condenser 8 to be described more fully hereinafter will be contained by and confined within the arrester 10.

Figure 3:
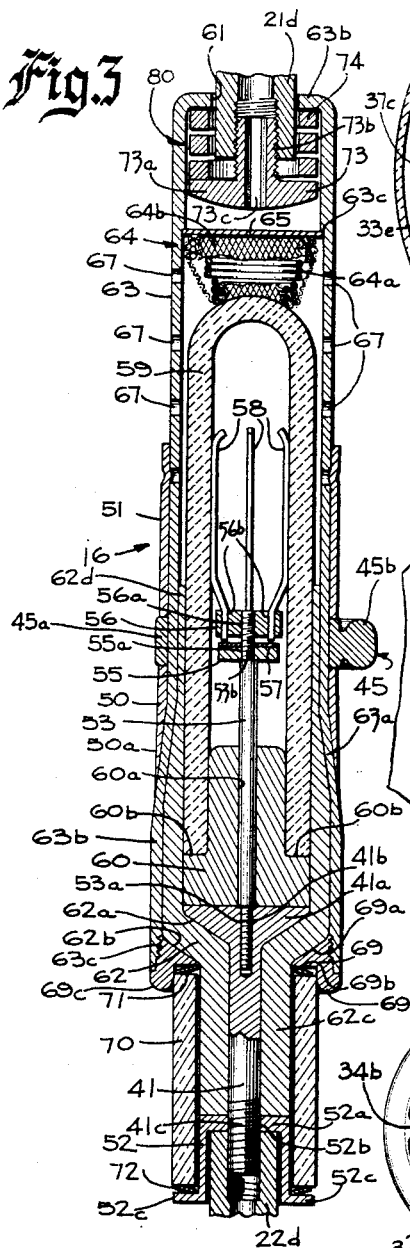
Fig. 3 is a fragmentary sectional view particularly illustrating the assembly unit of the lightning arrester shown in Fig. 1.

Referring now to Figs. 2 and 3, the assembly unit 16, is there illustrated as supported by and disposed between the connectors 21 and 22. Specifically, one end of the assembly unit 16, and in particular the externally threaded end portion 41c of a stem-like member 41 threadedly engages the internally threaded cavity 22e while the other end of the assembly unit 16 carries an externally threaded adjustable coupling member or bolt 73 in engagement with the internally threaded cavity 21e. More particularly, the stem 41 includes an enlarged, tapered head 41a which is provided with a longitudinally extending internally threaded opening 41b for engaging a threaded end 53a of an elongated rod 53. The rod 53 further includes a threaded end 53b upon which the internal condenser plates 58 of the condenser 8 are carried. To effect electrical connection of the plates 58 to the connector 22, the rod 53 and the stem 41 are both formed of electrical conducting material.

To mount the condenser plates 58 upon the rod 53, the end 53b threadedly engages internally threaded centrally disposed holes 55a and 56a in condenser-plate support disks 55 and 56. The support disk 56 is further provided with a plurality of spaced apertures 56b each of which snugly receives the circular, offset end of one of the internal condenser plates 58. To provide a common electrical connection for all of the plates 58, the support disk 55 carries a conducting wafer 57 having an exposed surface portion in engagement with the lower ends of the plates 58 which protrude beyond the support disk 56. The internal condenser plates 58 comprise generally rod-like members disposed parallel to each other and contiguous to the internal surface of a condenser insulating or dielectric member 59 having a generally tubular construction with a closed end. A plug 60 of generally cylindrical shape is provided with an axial bore 60a for receiving the rod 53 and is further provided with a circular head portion 60b having the same outer diameter as and positioned adjacent to the tapered head 41a of the stem 41. The body of the plug 60 is inserted into the open end of the tubular dielectric member 59 until the head 60b abuts against the exposed end of the tubular member. From the foregoing description it will be evident that when the stem 41, the plug 60 and the insulating member 59 are assembled, they assume a substantially cylindrical configuration having a tapered portion formed by the head 41a. To maintain these elements in assembly, they are surrounded by a hollow insulating member 62 having a generally cylindrical shape and having a ledge 62a abutted against the complementary tapered head 41a of stem 41. The hollow member 62, terminating at its lower end in a reduced portion 62c and at its upper end in another reduced portion 62d which extends inwardly to about the center of the assembly unit 16, is interposed between the elements 41, 59 and 60 and an external condenser plate 63 which is also in the form of a hollow cylinder having an enlarged tapered section 63a. The thickness of the member 62 gradually increases from top to bottom as viewed in Fig. 3 in order to compensate for the tapered section 63a of the condenser plate 63, described in greater detail hereinafter. From the above expansion, it is evident that the condenser plate 63 is adapted to be telescoped over the members 59 and 62 with the member 62 functioning to space the condenser plate 63 from the dielectric member 59, thereby enclosing a band of air between these two elements.

To position the closed end of the dielectric member 59 with respect to the condenser plate 63, a cushioning means 64 is provided. More specifically, the cushioning means 64 comprises a coil spring 64a of generally conical configuration surrounded by a silver plated webbing 64b, the spring 64a having its base abutted against and supported by a thin disk 65 which is seated upon a shoulder 63c formed internally of the condenser plate 63. The end of the spring 64a remote from the disk 65 engages the closed end of the tubular dielectric member 59 with the result that the spring resiliently positions the member 59 relative to the external condenser plate 63. It will be observed that the external condenser plate 63 is of generally cylindrical configuration and has a partially closed end 63b having defined therein an aperture 61 through which extends the inner end portion 21d of the antenna connector 21. To provide for escape of gas under pressure in the event of an explosion caused by a faulty condenser, there are defined, throughout approximately the upper half of the external condenser plate 63 as viewed in Fig. 3, a plurality of spaced apertures 67 longitudinally aligned in rows, the apertures of each row being in staggered relationship with respect to the apertures of adjacent rows.

In order to maintain the component elements of the unit 16 in assembly, the condenser plate 63 has a portion 63b of enlarged diameter adjacent to the connector 22 and a tapered section 63a. As is best shown in Fig. 3, the enlarged end 63b of the external condenser plate 63 is internally threaded, as indicated at 63c, to provide for threaded engagement with an annular bushing 69 made of aluminum or the like. The bushing 69 is threaded into the condenser plate 63 until a tapered portion 69a thereon frictionally engages the shoulder 62b of the insulating member 62. Thus, the bushing 69 is inserted into the threaded portion 63c until the elements 65, 64, 59, 60, 53, 41 and 62 of the tensioning assembly unit are brought into snugly fitting, assembled relationship. The operations required in the actual assembly of these elements will be described in greater detail as the description proceeds. This bushing 69 is provided with a raised annular ring 69c which cooperates with the reduced end portion 62c of the member 62 to provide a recess or seat 69b for a high impedance, leakage resistor 70 of hollow cylindrical shape. This resistor has an internal diameter slightly larger than the diameter of the reduced portion 62c of the member 62 to facilitate telescoping of the resistor over the insulating member 62 and snugly seating the end thereof into the recess 69b formed by the bushing 69. A spring washer 71 is adapted to be positioned within the recess 69b in order to cushion and support the resistor 70 when seated.

As best shown in Fig. 3, the end of the assembly unit 16 adjacent to the equipment connector 22 comprises a metallic collar 52 of generally cup-shape for maintaining the resistor 70 in assembly with the other elements of the unit 16. More specifically, the bottom 52a of the collar 52 has defined in the center thereof an internally threaded aperture 52b for receiving the threaded end portion 41c of the stem 41. The collar 52 further comprises a laterally extending annular ledge 52c for pressing the resistor 70 within its seat 69b. Thus, the collar 52 is threaded onto the end portion 41c and is inserted into the lower end of the resistor 70 as viewed in Fig. 3 until the ledge 52c exerts a force through washer 71 longitudinally of the resistor 70, whereby the resistor is forced into the recess 69b. The collar 52 is so dimensioned as to permit the circular inner end portion 22d of the connector 22 to be received therein as the stem 41 is threaded into the cavity 22e of the connector 22. As shown in Fig. 3, the bottom 52a of the collar 52 limits the movement of the stem 41 into the internally threaded cavity 22e and functions to hold the resistor 70 and the condenser 8 in assembled relationship within the assembly unit 16.

It will be apparent that an electrical connection is provided from the external condenser plate 63 through the bushing 69, through spring washer 71, through resistor 70, through spring washer 72, through collar 52, and through stem 41 to the connector 22. In this manner the resistor 70, which preferably has a high resistance of the order of seven megohms, may dissipate or leak off the static charges accumulated on the antenna. As shown in Fig. 7, the resistor 70 shunts the condenser 8 and, therefore, must be able to withstand the full impact of high current lightning surges, and also must limit corona current to a low value which, in a particular application of the arrester of the present invention, was below 100 milliamperes.

To maintain the components of the aircraft lightning arrester 10 in assembled relationship, there is provided a coupling means indicated generally as 80 interconnecting the antenna connector 21 and the end of the assembly unit 16 disposed adjacent thereto. As contrasted with the rigid attachment of the assembly unit 16 to the connector 22, the antenna end of the external condenser plate 63 is adapted to be freely and adjustably mounted upon the connector 21. Thus, the coupling means 80 engages the connector 21 in such manner that a simple manual adjustment draws the connectors 21 and 22, the cup-shaped members 33 and 34, and the arc shields 37 and 38 into assembled relationship. To this end, the coupling means 80 comprises the adjustable bolt 73 including a head 73a and a threaded body portion 73b in engagement with the internally threaded cavity 21e of the connector 21. To provide sufficient resilient force for holding the elements in assembly, a relatively large coil spring 74 is positioned between the head 73a of the bolt 73 and the closed end 63b of the external condenser plate 63, as best shown in Fig. 2. In order to facilitate adjustment of the bolt 73 within the cavity 21e, the body portion 73a is provided with an axial hexagonal opening 73c in alignment with the cylindrical bore 21f in the connector 21. Thus, an Allen-head wrench or a similar adjusting tool may be inserted through the bore 21f and into engagement with the opening 73c so that the position of the bolt 73 may be selectively altered from the exterior of the lightning arrester in order to exert a force which is transferred through the spring 74 to the closed end 63b of the external condenser plate 63. The condenser plate 63 thus moves along the circular end portion 21d of the connector 21 towards the antenna jack, thereby drawing and maintaining the connectors 21 and 22, the cup-shaped members 33 and 34 and the arc shields 37 and 38, and their respective gaskets 35, 36, 39 and 40 into assembled relationship. The force of the coil spring 74 on the condenser plate 63 thus causes all of the last-mentioned members to be placed under a compression force which is sufficient to urge the components together in order to create an air-tight and pressure-tight sealed housing 15. After the proper compressive force has been imparted to the internal housing 15, the Allen-head wrench is withdrawn from the connector 21 and the plug 75 of brass or other suitable material is inserted into the bore 21f of the connector 21 and is soldered within the external cavity 21c of the connector 21 in the position shown in Fig. 2.

To position and support an inner electrode 45 on the spark gap unit 17 upon the assembly unit 16, a pair of sleeves 50 and 51 are disposed about the condenser plate 63. More specifically, the sleeves 50 and 51 made of Teflon or other insulating material of this type have very thin walls defining a generally hollow cylindrical configuration. The sleeve 50 has a tapered section 50a which is shaped to complement the tapered section 63a of the external condenser plate 63. Thus, it will be apparent that the Teflon sleeve 50, when inserted over the antenna end of the assembly unit 16 slides along the condenser plate 63 until it abuts the tapered section 63a. In this manner the Teflon sleeve 50 provides a rigid abutment support for the internal electrode 45 which is likewise adapted to encircle the condenser plate 63. With one edge of the internal electrode 45 abutted against the sleeve 50, the second sleeve 51, having a true cylindrical form, is inserted over the antenna end of the assembly unit 16 and is moved along the condenser plate 63 until it rests tightly against the other edge of the internal electrode 45. The sleeve 51 may be secured and locked in position by deforming portions of its thin walls into certain of the relief apertures 67 in the condenser plate 63, as by the use of a round-end tool, whereby the electrode 45 is prevented from moving longitudinally along the surface of the condenser plate 63.

Figure 5:
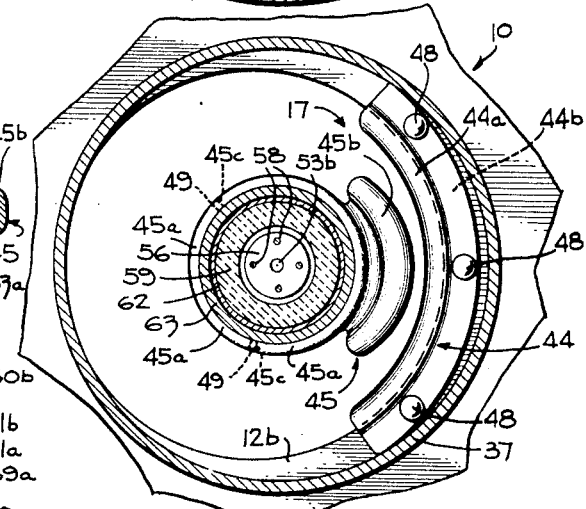
Fig. 5 is a fragmentary sectional view taken along line 5—5 of Fig. 2 assuming again that the latter shows the complete structure.

Briefly, the spark gap unit 17 comprises, in addition to the electrode 45 first described, an external electrode 44, made of brass or the like, mounted upon an inwardly disposed internal flange 12b of the mounting ring 12 as shown in Figs. 2 and 5. More specifically, as best shown in Fig. 5, the internal flange 12b of the mounting ring 12 is eccentrically positioned relative to the arc shields 37 and 38 and to the assembly unit 16 so that the spacing between the inner periphery of the flange 12b and the gas shields 37 and 38 gradually decreases from a maximum along an imaginary radial line bisecting each of the electrodes 44 and 45 to a minimum at a point 180 degrees displaced therefrom. The external electrode 44, somewhat arcuate in shape as viewed in Fig. 5, has an enlarged head portion 44a and includes a peripheral groove 44b to facilitate its attachment to the mounting ring 12. At spaced positions along the arcuately shaped external electrode 44, there are provided a plurality of apertures 46 in alignment with spaced apertures 47 formed in the flange 12b. In the assembly of the electrode 44 upon the mounting ring 12, the groove 44b in the periphery of the external electrode 44 receives the internal flange 12b and suitable fastening means such as rivets 48 are passed through the aligned apertures 46 and 47 as shown in Figs. 2 and 5. In the embodiment of the spark gap unit 17, shown in Fig. 5, it will be observed that the arcuate external electrode 44 spans approximately 120 degrees of a circle, but it should be understood that this span is not critical.

The inner electrode 45 of the spark gap unit 17 also formed of brass or the like, comprises an annular band 45a having an enlarged head portion 45b integrally associated therewith along a section thereof, as shown in Figs. 2, 3 and 5. To prevent rotation of the electrode 45 about the condenser plate 63, a pair of spaced threaded apertures 45c are defined within the annular band 45a for receiving a pair of set screws 49 which, when tightened, engage the outer surface of condenser plate 63. In assembling the internal spark gap electrode 45, the latter, and in particular, the head portion 45b, is oriented relative to the external spark gap 44 so that these two electrodes are disposed in alignment as shown in Fig. 5. It will be understood that the spark gap unit may be set to break down at any desired predetermined voltage by altering the spacing between the electrodes 44 and 45, as by moving these electrodes out of alignment. When a potential difference is applied across the electrodes of the spark gap unit, a breakdown occurs to produce an initial arc substantially along the transverse bisector of the electrodes 44 and 45, i.e., across the air gap of minimum length. Immediately thereafter the arc itself tends to increase in length because of the thermal and magnetic forces of the initial arc current, and tends to move away from the transverse bisector of the electrodes 44 and 45 and toward the terminal edges of these electrodes. In this manner, the surfaces of the electrodes 44 and 45 at the point of initial breakdown are preserved, and the pitting and eroding of the electrode surfaces caused by a stationary or fixed arc are eliminated, thereby maintaining the magnitude of the initial breakdown voltage of the spark gap unit at a substantially constant value.

It is manifest that the above described elongation of the spark gap arc is not limited to one particular plane but actually occurs in three dimensions. In order to prevent unnecessary burning of the cup shaped members 33 and 34 and the exposed elements of the assembly unit 16 as a result of such elongation, the annular flanges 37a and 38a of the arc shields 37 and 38 and the Teflon sleeves 50 and 51 are so shaped, as indicated above, as to form a chamber confining the arc.

To facilitate an understanding of the aircraft lightning arrester of the present invention, the method of assembling the individual parts thereof has been described below. It will be observed that the aircraft lightning arrester comprises the following sub-assemblies: the assembly unit 16, the arc gap unit 17, the internal housing 15, and the external housing 14. The assembly of these sub-assemblies will be considered in the order in which they are ordinarily constructed in the fabrication of the lightning aircraft arrester.

In the assembly of the unit 16, the external condenser plate 63 is placed in a vertical position with its antenna end 63b downward. The bolt 73 is seated on the coil spring 74, and both of these members are inserted into the condenser plate 63, so that the edge of the coil spring rests against the partially closed end 63b of the condenser plate. The circular disk 65 is next dropped into the condenser plate 63 and seated upon the annular shoulder 63c in position to receive the cushioning means 64 when the latter is inserted into the condenser plate 63.

The internal condenser plate sub-subassembly is next assembled in the following manner. The support disks 55 and 56 together with wafer 57, are threaded onto the rod 53, and the internal condenser plates 58 are mounted upon the support disk 56. The rod is inserted through the plug 60 and threaded into the head 41a of the stem 41. The insulating or dielectric member 59 is then telescoped over the internal condenser plates 58 and is seated upon the head of the plug 60. Finally, the insulating member 62 is placed over the exposed end of the stem 41 and is moved along the plug 60 and the dielectric member 59 until the shoulder 62a abuts the tapered head plate 41a of the stem 41. The internal condenser plate sub-subassembly is next inserted within the external condenser plate 63 until the closed end of the dielectric member 59 engages the cushioning means 64.

To hold the external and internal condenser plates in assembly, the annular bushing 69 is threaded into the open end of the condenser plate 63 until the insulating member 59 is resiliently seated against the cushioning means 64. Spring washers 71 and 72 and the annular resistor 70 are next inserted over the reduced portion 62c of member 62 and the washer 71 and one end of resistor 70 are fitted into the recess 69b formed by the bushing 69. The assembly of the unit 16 is completed by threading the collar 52 onto the stem 41 until the ledge 52c resiliently positions the annular resistor between the two spring washers 71 and 72 and holds the resistor within the seat 69b.

The tapered Teflon sleeve 50 is then inserted over the closed end of the condenser plate 63 and moved therealong until it engages the tapered section 63a. The annular internal electrode 45 is placed over the condenser plate 63 with one edge in abutting relationship with the edge of the Teflon sleeve 50 and, thereafter, the Teflon sleeve 51 is moved against the other edge of the electrode 45. The frictional forces existing between the Teflon sleeve 50 and the external condenser plate 63 are sufficient temporarily to prevent longitudinal movement of the internal electrode 45.

At this point, the two connector sub-assemblies are constructed. The outer ends of bellows 23 and 24 are respectively soldered to the bellows spring washers 25 and 26 and these bellows are inserted over the outer ends 21b and 22b of the connectors 21 and 22 and are moved against the shoulders 21g and 22g. The inner ends of the bellows are then soldered to the connectors 21 and 22 at the annular shoulders 21g and 22g.

The internal housing 15 is then assembled to enclose the vertically disposed assembly unit 16, and, at the same time, to align the spark gap unit 17. To this end, with the communication equipment connector 22 held in a vertical position, the silicon gasket 36 is placed on the annular flange 22a of the connector 22 and the cup-shaped member 34 is seated on this gasket by inserting the same over the inner end portion with the indents 22h and the ridges 34b in engagement in order to provide the desired alignment. Next, the arc shields 37 and 38 are soldered to the mounting ring 12 and the external electrode 44 is attached to the internal flange 12b of the mounting ring by passing rivets 48 through the aligned apertures 46 and 47.

The silicon gasket 40 is seated on the enlarged end 34d of the cup-shaped member 34 and then the arc shield 38 soldered to the mounting ring 12 is seated thereon with the indents in the member 34 and the ridges in the shield 38 cooperating to effect the alignment of these parts.

To align the electrodes 44 and 45 in a vertical direction as viewed in Fig. 2, the assembly unit 16, and particularly the stem 41 thereof, is temporarily threaded into the cavity 22e of the connector 22 until the edge of the inner end portion 22d contacts the partially closed end 52a of the collar 52. The axial alignment of the electrodes 44 and 45 is checked visually, and, if satisfactory, the assembly unit 16 is unthreaded from the connector 22 and portions of the sleeve 51 are deformed into certain of the apertures 67 in order to maintain the electrode 45 in fixed position along the condenser plate 63. If the electrodes 44 and 45 are not vertically aligned, the Teflon sleeve 50 is shortened, as by abrading one of its edges, by an amount sufficient to bring the electrodes into alignment. After the electrodes have been aligned vertically, the set screws 49 are tightened to lock the internal electrode 45 in position. Furthermore, the Teflon sleeve 51 is locked to the condenser plate 63 by indenting portions of the sleeve into the apertures 67 as described above, thereby preventing longitudinal movement of the electrode 45 along the condenser plate 63.

The assembly unit 16 is once again threaded into the cavity 22e of the connector 22 until the end of the inner end portion 22d abuts against the closed end 52a of the collar 52. The silicon gasket 39 is then placed upon the flange 37a of the arc shield 37 and the member 33 is cupped over the assembly unit 16 and seated upon the gasket 39 with the indents 33e in the member 33 and the ridges 37c in the shield 37 in engagement. The silicon gasket 35 is next placed on the closed end 33a of the cup-shaped member 33 and, after which, the connector 21 is inserted into the end of the member 33 until its flange 21a rests upon the gasket 35. At this time, the internal housing 15 and the assembly unit 16 are inverted so that the bolt 73 enters the cavity 21e of the connector 21 under the force of gravity. A suitable tool, such as an Allen-head wrench, is inserted through the bore 21f to engage the hexagonal axial opening 73c in the bolt 73 whereupon rotation of the tool advances the bolt 73 into the cavity 21e and exerts force through the spring 74 against the closed end 63b of the external condenser plate 63, thereby moving the external condenser plate 63 along the inner end portion 21d of the connector 21. As the external condenser plate 63 advances along the portion 21d, the internal housing members 33 and 34, the arc shields 37 and 38 and their associated gaskets are drawn together by and are maintained under a compressive force exerted between the connectors 21 and 22, thereby insuring a snugly fitting assembly. After the adjusting tool has been removed from the opening 73c in the bolt 73, the plug 75 is inserted into the bore 21f and is soldered within the external cavity 21c, thereby providing an air-tight seal.

Prior to the completion of the assembly, it is important that the gap breakdown voltage be set to the desired value, which in a particular application of the present invention, was found to be approximately 8,000 volts maximum at 4 megacycles. In order to set or vary the value of the gap breakdown voltage, the set screws 49 are loosened to permit the internal electrode 45 to be rotated relative to the external electrode 44, thereby increasing or decreasing the shortest air gap distance between the two electrodes.

As the final step in the assembly operation, the external housing members are placed in position. To this end, the connector bushings 27 and 28, the jackets 29 and 30, and the annular bushings 31 and 32 are hermetically sealed together. After placing the hermetically sealed members about the internal housing 15 and seating the annular bushings 31 and 32 on the mounting ring 12, the bushings 27 and 28 are soldered to the bellows spring washers 25 and 26, respectively. The final assembly operation comprises soldering the annular bushing 32 and 33 to the mounting ring 12. In this manner, the aircraft lightning arrester is provided with both a gasket sealed housing and a hermetically sealed housing to maintain substantially constant the air resistance and pressure of the arc gap chamber and to insure that any explosion caused by a faulty condenser will be contained within and confined to the arrester.

Referring now to the mode of operation of the aircraft lightning arrester, attention is directed to the circuit diagram of Fig. 7. As has been indicated hereinbefore, the antenna of an aircraft frequently intercepts either cloud to cloud discharge surges or cloud to ground discharge surges. Many lightning strokes intercepted by the aircraft antenna involve relatively low current rates of rise, i.e., a maximum value of 5,000 amperes reached in .005 sec. and decaying gradually thereafter. As indicated above, aircraft arresters of the simple air-gap type will not break down rapidly enough to prevent high lightning currents from permanently damaging the aircraft communication equipment. To insure that the spark gap unit will break down at a particular voltage, the condenser 8 is inserted in series between the antenna 5 and the electronic air craft equipment 6. When the antenna intercepts a lightning surge of the wave shape described above, the condenser 8 is charged very quickly to the breakdown voltage of the spark gap unit 17. Since the capacitor and spark gap unit are in parallel, the voltage builds up across the condenser until the breakdown voltage of the spark gap unit is reached. It is manifest that the condenser must be able to block voltages of the order of the spark gap breakdown voltage without condenser breakdown or failure. Once the condenser 8 has been charged to the breakdown voltage, an arc is established between the internal and external electrodes 44 and 45. In this manner the charge of the high current lightning surges will be diverted from the electronic equipment to ground or the surface of the aircraft along the path provided by the spark gap units.

As shown by Fig. 7, the high impedance resistor 70 is connected in parallel with both the condenser and the spark gap unit 17 and, hence, provides a leakage path for static charges built up on the antenna 5. It should be observed, however, that the introduction of the resistor into the arrester circuit neither impairs nor affects the operation of the spark gap unit. Thus, even though a leakage current of 100 microamperes flows through a resistor 70 having a value of 7.5 megohms to develop a voltage drop of approximately 750 volts, the spark gap nevertheless only breaks down when a voltage equal to the spark gap voltage is supplied to the antenna.

The RF oscillating voltage developed or detected by the aircraft transmitting or receiving equipment effectively exists between the terminal 22 and the fuselage and, although the condenser 8 acts as a short circuit for the high frequency RF voltage, the voltage at terminal 21 differs from the voltage at terminal 22 by an amount equal to the voltage drop across the resistor 70 due to the leakage current. Accordingly, it is necessary that the spark gap be adjusted to break down at a voltage higher than the peak value of the normal RF voltage plus the voltage developed across the bypass resistor 70.

The condenser employed in one application of the present invention was found to be capable of passing 10 amperes RF current at 4 megacycles for a period of ten minutes without significant heating of any parts or indication of failure. Moreover, this condenser was capable of passing the normal RF voltages of the magnitude of 4,000 to 12,000 volts without breakdown and without failure. Furthermore, the condenser was able to block any high current lightning surges, and more particularly was able to block the gradually decreasing transient wave shape of a lightning surge after the condenser had been charged to its maximum value.

As will be evident from the foregoing explanation, an aircraft lightning arrester is provided for protecting electronic aircraft equipment from high current lightning surges by dissipating the surges across a spark gap unit. This lightning aircraft arrester is also adapted to withstand and divert repeated high current lightning surges since the air gap electrodes are so constructed that the conducting arc is moved away from the points of initial breakdown, thereby preserving and protecting the electrodes from burning, pitting, eroding, or the like. One of the primary features of the invention resides in the assembly unit including the compact blocking condenser which unit may be readily installed in order to maintain the component elements of the aircraft lightning arrester in assembled relationship.

While the details of the present invention have been described in connection with an illustrative embodiment thereof, it should be understood that such details are not intended to limit the invention since many modifications will be apparent to those skilled in the art which, nevertheless, fall within the true spirit and scope of the invention as set forth in the accompanying claims.

Having thus described the invention, what is claimed as new and desired to be secured by Letters Patent of the United States is:

1. A lightning arrester of the combined spark gap condenser type for use on aircraft to protect communication equipment from lightning surges intercepted by an aircraft antenna comprising an insulated housing, a pair of connectors disposed at spaced positions on said housing, an external spark gap electrode within the housing, a plate carrying said electrode and extending to the exterior of said housing, coupling means carried by one of said connectors internally of said housing, an assembly unit secured at one end to the other of said connectors and at the other end to said coupling means, said assembly unit including spaced capacitor plates each electrically connected to a different one of said connectors, resilient means interposed between said coupling means and said assembly unit for maintaining said housing and said assembly unit in assembled relationship, and an internal spark gap electrode electrically connected to said one connector and spaced from said external electrode to provide a high voltage discharge path to by-pass lightning surges to the exterior of the housing before they can reach said capacitor plates.

2. The structure defined by claim 1 wherein there is additionally provided a resistor carried by said assembly unit and electrically connected across said capacitor plates.

3. A lightning arrester of the combined spark gap condenser type for use on aircraft to protect communication equipment from lightning surges intercepted by an aircraft antenna comprising an insulated housing, first and second connectors disposed at spaced positions on said housing, an external spark gap electrode within said housing, a plate carrying said electrode and extending to the exterior of said housing, an internal assembly unit having opposed members adjustably secured to a different one of said connectors, resilient coupling means interposed between the assembly unit and one of said connectors to maintain said housing and said unit in assembled relationship, said assembly unit including spaced condenser plates each electrically connected to a different one of said connectors, and an internal spark gap electrode carried by said assembly unit electrically connected to said one connector and cooperating with said external electrode to provide a high voltage discharge path to by-pass lightning surges to the exterior of the housing.

4. In combination, an aircraft, communication equipment carried by the aircraft and including a receiving antenna, and a lightning arrester for protecting said communication equipment from lightning surges intercepted by said antenna, said lightning arrester comprising an insulated housing, a pair of external connectors disposed at spaced positions on said housing and respectively connected to said aircraft antenna and to said communication equipment, means on said housing for mounting said arrester upon the fuselage of said aircraft, an external spark gap electrode located within the housing in electrical contact with the fuselage through said mounting means, an assembly unit disposed internally of said housing and including spaced members each in engagement with a different one of said spaced connectors, at least one of said members being adjustably secured to its associated connector in order to assemble said unit and said housing, said assembly unit further including spaced condenser plates each electrically connected to a different one of said connectors, and an internal spark gap electrode carried by said assembly unit and cooperating with said external electrode to provide a high voltage discharge path for the lightning surges.

5. The structure defined by claim 4 wherein there is also provided a resistor carried by said assembly unit and electrically connected across said condenser plates.

6. In combination, an aircraft, communication equipment carried by the aircraft and including a receiving antenna, and a lightning arrester for protecting said communication equipment from lightning surges intercepted by said antenna, said lightning arrester comprising an insulated housing, a pair of external connectors disposed at spaced positions on said housing and respectively connected to said aircraft antenna and to said communication equipment, means on said housing for mounting said arrester upon the fuselage of said aircraft, an external spark gap electrode carried by said mounting means and in electrical contact with the fuselage, a condenser assembly unit having an internal spark gap electrode mounted thereon spaced from said external spark gap electrode, said internal electrode being electrically connected through the assembly unit to the connector for said antenna in order to cooperate with the external electrode to provide an air gap discharge path for lightning surges, said assembly unit including coupling means carried at one end thereof to interconnect said assembly unit and one of said connectors, and resilient means disposed between said coupling means and said one end of said assembly unit for retaining said housing and said assembly unit in assembled relationship.

7. In a lightning arrester of the combined spark gap condenser type for use on aircraft in protecting communication equipment from lightning surges intercepted by an aircraft antenna, a housing, a pair of spaced connectors carried by said housing, one of said connectors being electrically connected to said antenna and the other of said connectors being electrically connected to said equipment, an assembly unit having its opposed ends respectively connected to said connectors to retain said arrester in assembled relationship, which unit comprises a condenser having spaced condenser plates respectively connected to said connectors, a resilient coupling means adjustably engageable with and interconnecting one end of said assembly unit and one of said connectors for assembling said assembly unit and said housing, a spark gap formed by electrodes respectively carried by said assembly unit and said housing, one of said electrodes being electrically connected to said one connector, and means electrically connecting the other of said electrodes to the aircraft so that lightning discharges are by-passed from said condenser to said aircraft.

8. The lightning arrester of claim 7 wherein said coupling means includes a threaded element for engaging said one connector, and a resilient member interposed between said threaded element and said one end of said assembly unit.

9. The structure defined by claim 7 wherein there is also provided a resistor carried by said assembly unit and electrically connected across said condenser plates.

10. The lightning arrester of claim 8 wherein said resilient means comprises a coiled spring encircling said threaded element and wherein said threaded element includes an enlarged head portion in engagement with said coiled spring.

11. In an aircraft lightning arrester for protecting aircraft communication from lightning surges intercepted by an aircraft antenna, a housing, spaced connectors carried by said housing, one of said connectors being electrically connected to said antenna and the other of said connectors being electrically connected to said equipment, an assembly unit connected between said connectors and including a condenser adapted to block high surge voltages and to pass RF voltages, said unit comprising a cover member comprising a condenser plate for said blocking condenser, means freely interconnecting one end of said cover member and one of said connectors, at least one internal condenser plate positioned within said cover member, means electrically connected to said internal plate rigidly engaging said unit with the other of said connectors, a coupling member in engagement with said one connector and said one end of said cover member, resilient means interposed between said one end of said cover member and said coupling member, said coupling member being movable longitudinally of said one connector, whereby longitudinal movement of said coupling means relative to said connector exerts a force through said resilient means to move said cover member relative to said connector and retains said arrester in assembled relationship a spark gap formed by electrodes respectively carried by said assembly unit and by said housing, one of said electrodes being electrically connected to said one connector, means electrically connecting the other of said electrodes to the exterior of said housing, and means for electrically connecting said last mentioned means to said aircraft so that lightning discharges are by-passed from said condenser to said aircraft.

12. In combination, an aircraft, communication equipment carried by the aircraft and including a receiving antenna, and a lightning arrester for protecting said communication equipment from lightning surges intercepted by said antenna, said lightning arrester comprising a housing, first and second connectors carried by said housing and respectively electrically connected to said equipment and to said antenna, means for mounting said arrester on the aircraft, an external spark gap electrode secured to said mounting means, a pair of housing members respectively secured to said first and second connectors at one end and each secured at its other end to said mounting means, an assembly unit connected between said first and second connectors, said assembly unit including at least one internal condenser plate and an external condenser plate spaced therefrom, means to electrically connect said internal plate to said first connector, means for freely and adjustably connecting said external plate to said second connector, an internal spark gap electrode supported by said assembly unit, electrically connected to said first connector, and cooperating with said external spark gap electrode to provide a spark gap for by-passing lightning surges to said aircraft before they reach the condenser, and a relatively high impedance resistor carried by said assembly unit and interconnected between said external condenser plate and said first connector to leak off static charges accumulated upon the antenna.

13. An aircraft lightning arrester for use in high altitude aircraft to protect aircraft communication equipment from lightning or static charges intercepted by the aircraft antenna comprising first and second housings, first and second connectors carried by said first and second housings and respectively electrically connected to said equipment and said antenna, said second connector having a longitudinal bore extending at least partly therethrough, an assembly unit connected between said first and second connectors and including first and second condenser plates respectively connected to said first and second connectors, an internal spark gap electrode supported by said assembly unit and electrically connected to said second connector, an external spark gap electrode supported from at least one of said housings and connected to the aircraft, a coupling member received within the bore in said second connector, and resilient means supported between said coupling member and said assembly unit, said coupling member being adjustable within said bore to tension said first and second housings and said assembly unit.

14. An aircraft lightning arrester for use in high altitude aircraft to protect aircraft communication equipment from lightning or static charges intercepted by the aircraft antenna comprising a generally annular mounting plate, an outer electrode mounted on the innermost portion of said plate, a first housing member secured on a first face of said plate and having an inwardly extending portion, a second housing member secured on a second face of said plate and having an inwardly extending portion, a first envelope secured on said first face of said plate outwardly of said first member, a second envelope secured on said second face of said plate outwardly of said second member, a first connector adapted to be electrically connected to said antenna secured to said first member and first envelope, said first connector having an outwardly extending flange in engagement with said portion of said first member, a second connector adapted to be electrically connected to said communication equipment secured to said second member and second envelope, said second connector having an outwardly extending flange in engagement with said portion of said second member, said first connector having an opening extending partially therethrough, the inner portion of said opening being internally threaded, an elongated cover comprising one plate of a condenser having an opening defined in one end for receiving the inner portion of said first connector, said cover being secured at its other end to said second connector, an elongated dielectric structure disposed within said elongated cover, an inner condenser plate located within said dielectric structure and electrically connected to said second connector, an inner electrode mounted on said cover in alignment with said outer electrode, a coupling member threadedly received within said internally threaded portion of said first connector, and biasing means located between said cover and said coupling member for maintaining said connectors, said housing members, and said envelopes in assembled relationship.

15. The arrester of claim 14 wherein said opening in said first connector extends throughout the entire length of said connector so that said coupling member is adjustable from outside of the arrester, and wherein there is additionally provided a plug removably disposed within said opening.

16. The arrester of claim 14 wherein said mounting plate includes an outer section for attachment to the fuselage of the aircraft and an inner section disposed inwardly of the housing members and envelopes for supporting said outer electrode.

References Cited in the file of this patent

UNITED STATES PATENTS

| | | |
|---|---|---|
| 1,194,195 | Jackson | Aug. 8, 1916 |
| 2,068,100 | Finch | Jan. 19, 1937 |
| 2,089,555 | Hull | Aug. 10, 1937 |
| 2,328,150 | Kniepen | Aug. 31, 1943 |

FOREIGN PATENTS

| | | |
|---|---|---|
| 407,725 | Germany | Jan. 2, 1925 |
| 345,604 | Great Britain | Mar. 26, 1931 |
| 670,676 | Germany | Jan. 23, 1934 |
| 847,379 | France | June 26, 1939 |